Jan. 22, 1935.  J. KIPPER  1,988,558
MEAT MOLD
Filed Sept. 26, 1931
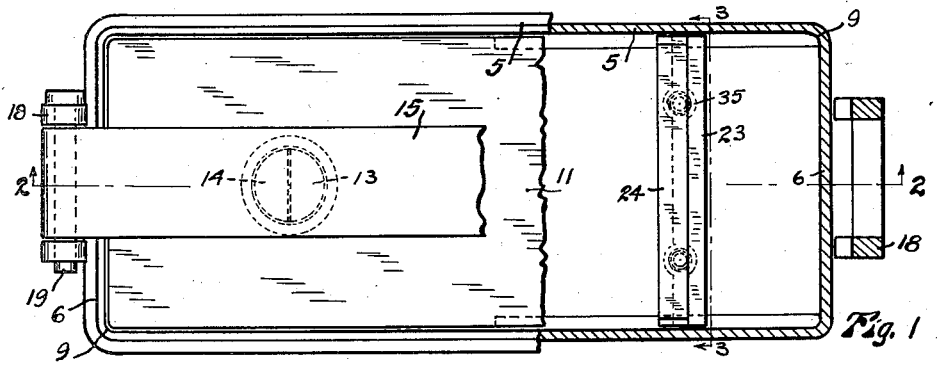
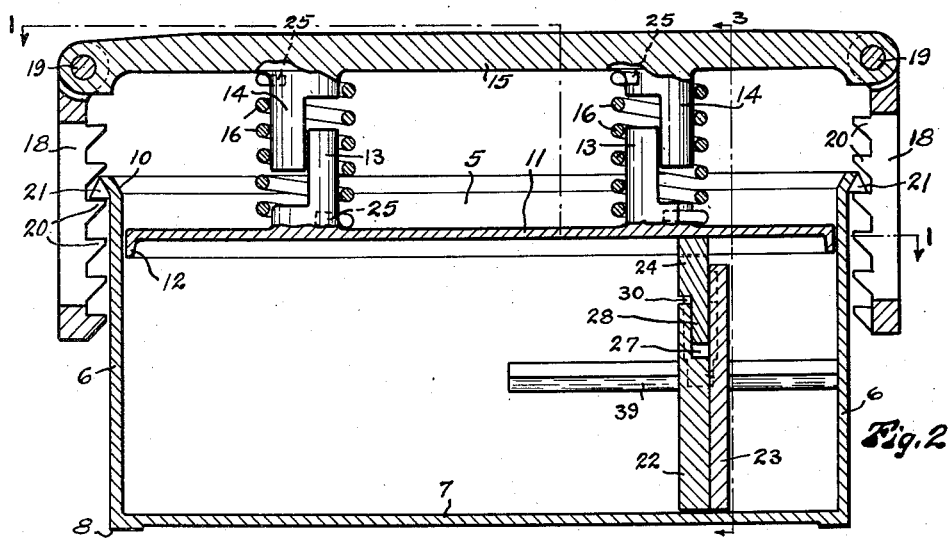
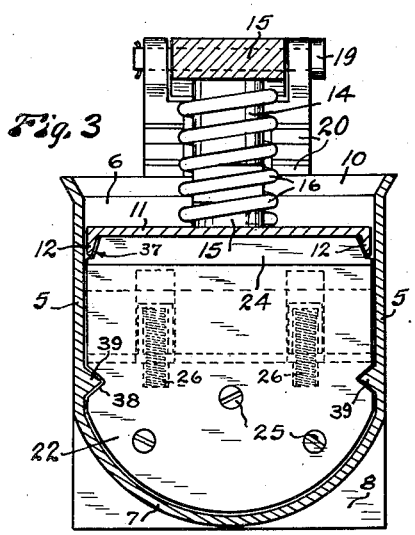
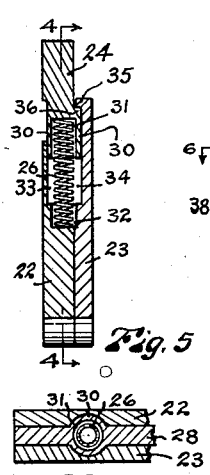
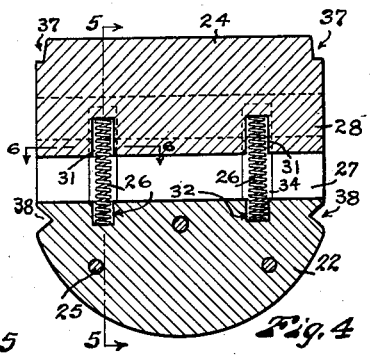
INVENTOR
Joseph Kipper
BY
Fred C. Matheny
ATTORNEY Patented Jan. 22, 1935

1,988,558

UNITED STATES PATENT OFFICE 1,988,558

MEAT MOLD

Joseph Kipper, Seattle, Wash.

Application September 26, 1931, Serial No. 565,293

4 Claims. (Cl. 100—57)

My invention relates to improvements in meat molds and my present invention is in the nature of an improvement on the meat molds disclosed in my Patent No. 1,581,640, issued April 20, 1926, and my prior application Serial No. 408,624. Filed Nov. 20, 1929.

The primary object of my present invention is to provide a meat mold which is adjustable to vary the length of the molded loaf whereby molds of one size may be used for hams of different size or for different amounts of meat without variation in the cross sectional size of the finished loaf, it being understood that the size of the slice which may be cut from a loaf is determined by the cross section of the loaf and that slices of uniform size are desirable.

A more specific object of my invention is to provide a meat mold having an adjustable end plate therein, said adjustable end plate having a spring expanded relatively telescopic portion whereby the size of said adjustable end plate may vary automatically in response to pressure of a resiliently supported movable cover plate which is movably disposed within said mold.

Another object of my invention is to provide an adjustable end plate of novel and efficient construction for a mold of this nature said end plate being arranged to remain in a fixed position after it has been set and the cover applied.

Another object is to provide a meat mold of this nature which may be conveniently operated by hand, and one in which the meat will be maintained under constant pressure regardless of shrinkage of the meat during cooking or treating processes.

Further objects are to provide a meat mold that is strong and compact in construction, neat in appearance, easy to manipulate, not expensive to manufacture and one that is sanitary and easily cleaned and sterilized.

Other and more specific objects will be apparent from the following description taken in connection with the accompanying drawing.

In the drawing Figure 1 is a plan view looking down onto the top of a meat mold constructed in accordance with my invention, parts being shown in section substantially on broken line 1—1 of Fig. 2.

Fig. 2 is a view in longitudinal section of the same substantially on broken line 2—2 of Fig. 1.

Fig. 3 is a view in cross section on broken line 3—3 of Fig. 2, the adjustable end plate being shown in elevation.

Fig. 4 is a detached sectional view of the adjustable end plate substantially on broken line 4—4 of Fig. 5.

Fig. 5 is a detached sectional view of said end plate substantially on broken line 5—5 of Fig. 4.

Fig. 6 is a fragmentary sectional view substantially on broken line 6—6 of Fig. 4.

In preparing meat, especially hams and shoulders of pork for the market, it is common practice to remove the bones and then compress and cook the meat in a mold. In my prior patent, hereinbefore identified, I have shown a mold receptacle having a cross sectional shape corresponding to the shape of a loaf of bread. In my present application I prefer to retain this same shape but I do not thus limit myself, as obviously molds of various cross sectional shape may be used.

Referring to the drawing, throughout which like reference numerals designate like parts, I show a rectangularly shaped integral mold receptacle having side walls 5, end walls 6 and a curved bottom 7, the curved bottom wall 7 corresponding to the curved side of a loaf of bread. The end walls extend below the curved bottom 7 to form square supports 8 on which the mold receptacle may rest. All corners within the mold are neatly rounded as at 9 to avoid forming pockets which are unsanitary and difficult to clean and the top edge of the mold is curved outward slightly as at 10, to facilitate the insertion therein of a presser plate 11 which forms a telescopic cover which fits into the mold. The edges of the presser plate 11 are flanged downwardly as at 12 to afford a better bearing against the sides of the mold and to form a concave surface on the side of the presser plate next to the meat. The presser plate fits closely within the mold so that the meat can not be forced upwardly between the wall of the mold and the edge of the presser plate.

The presser plate 11 has two upwardly projecting studs 13 of semicircular cross section on its top side, which fit squarely and slidably against the flat sides of two other studs 14 which extend downwardly from a retainer bar 15. Compression springs 16 are provided on the studs 13 and 14 between the presser plate 11 and the retainer bar 15 to exert a downward pressure on the presser plate when said presser plate is placed on the top of a mold full of meat and the retainer bar is made fast to the mold. The respective ends of the springs 16 are preferably inserted within holes 25 in the bases of the studs 13 and 14 so that the springs serve to prevent total disconnection of the retainer bar and the presser plate.

The retainer bar 15 is secured to the mold by means of multiple toothed catch members 18 which are connected by pivots 19 with the ends of the retainer bar and which have teeth 20 arranged to engage with external catch lugs 21 on the ends of the mold. The lower sides of the lugs 21 are inclined downwardly a slight amount and the upper sides of the teeth 20 on the catch members are similarly inclined upwardly so that after being placed in engagement they will remain in the engaged position as long as upward pressure is exerted on the retainer bar or until they are disengaged manually. The opposite sides of the teeth 20 and lugs 21 are inclined so as to ride over each other when the retainer bar is pushed down.

The adjustable end plate, which forms the subject matter of this invention, is preferably composed of three pieces, 22, 23 and 24. The two pieces 22 and 23 form the main body of the end plate and are secured together by screws 25. The other piece 24 is telescopically disposed relative to the pieces 22 and 23 and is urged to the outermost limit of its movement by compression springs 26. The piece 22 is notched as at 27 for the slidable reception of the bottom portion 28 of the piece 24, which bottom portion 28 is of narrower width than the top portion of said piece 24. The narrower bottom portion 28 of the relatively telescopic piece 24 is provided with two vertical rib portions 30, of greater width than the portion 28, which are bored as at 31 for the reception of the springs 26. The lower ends of the springs 28 seat within recesses 32 in the piece 22. The pieces 22 and 23 are both grooved as indicated at 33 and 34 respectively to afford working clearance for the rib portions 30 of the piece 24. A shoulder 35 at the upper end of each groove 34 is arranged to overhang the upper end 36 of the rib 30 which operates in said groove, as best shown in Fig. 5, to limit the upward movement of the part 24.

The part 24 is essentially placed between the parts 22 and 23 when said parts are put together and before the screws 25 are tightened. After the screws 25 have been tightened the three parts 22, 23 and 24 are secured together leaving the part 24 telescopic and free to be pressed downwardly by the presser plate 11. Notches 37 in the upper corners of the part 24 are provided to interfit the flange 12 on the presser plate 11. Other V shaped notches 38 in the sides of the parts 22 and 23 toward the lower end thereof are provided to fit over ribs 39 which are formed on the inner sides of the housing and extend from one end 6 of said housing outwardly far enough to cover the desired range of movement of the adjustable plate. The bottoms of the parts 22 and 23 are rounded, as shown, where a mold having a rounded bottom is used.

The adjustable end plate is easily inserted in the container by placing it in that portion of said container which is free from the ribs 39 and then sliding the same endwise within the container over the ribs 39. It may be removed in a similar manner by first moving it clear of the ribs 39.

In filling this meat mold the adjustable end plate is first placed in the mold receptacle and moved to a position near the end 6 of said mold receptacle adjacent the rib 39. The meat is then inserted and pressed down into the mold and at the same time the movable end plate is pressed tightly enough against the meat so that the top of the meat is brought approximately to the level of the top of the movable end plate. The presser plate is then applied and pressed tightly down onto the top of the meat and onto the top part 24 of the adjustable end plate, the springs 16 on the presser plate being placed under compression, said springs 16 being substantially stronger than the springs 26 in the adjustable end plate. The mold with the meat therein is then ready to be placed in the cooker. As the meat is cooked it will be maintained under constant pressure and there will be some shrinkage, which will be taken up by downward movement of the presser plate, the part 24 of the adjustable end plate moving downwardly at the same time. By the time the cooking is finished the part 24 of the adjustable end plate will have reached substantially its lowermost position irrespective of the length of the meat loaf. This always insures a meat loaf of substantially the same cross sectional size irrespective of the size of the ham or the amount of meat which is placed in the mold.

This mold is especially adapted for cooking meat but it may also be used for cooking other materials which are to be cooked in the form of a loaf.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. A meat mold of the class described, embodying a mold receptacle, a presser plate resiliently supported and telescopically disposed within the open top side of said mold receptacle, adjustable upright end plate means movable lengthwise within said mold receptacle in a direction at right angles to the direction of movement of said presser plate, said end plate means embodying relatively telescopic parts resiliently urged into extended position and compressible by engagement of said presser plate, and guide means within said mold receptacle cooperating with said end plate means whereby said end plate means is held in upright position and guided for longitudinal adjustment within the receptacle.

2. A meat mold of the class described, embodying a mold receptacle, a presser plate telescopically disposed therein, springs resiliently supporting said presser plate, adjustable end plate means movable lengthwise within said mold receptacle, said end plate means being compressible in response to pressure of said presser plate, and ribs on the inner walls of said mold receptacle extending lengthwise of the receptacle for a distance less than the length of the receptacle whereby said end plate means may be inserted within the portion of said receptacle which is clear of said ribs, said end plate means having grooves in the sides thereof which fit slidably over said ribs.

3. A meat mold of the class described, embodying a mold receptacle, a presser plate resiliently supported and telescopically disposed within said mold receptacle, manually adjustable upright end plate means movable within said mold receptacle in a direction at right angles to the direction of movement of said presser plate whereby the size of said receptacle may be varied to always obtain substantially the same cross sectional area of loaf regardless of the amount of material used, said end plate means embodying a lower main portion adapted to fit within the lower portion of said mold receptacle and a relatively telescopic spring pressed upper portion arranged to be engaged by said presser plate, said lower end plate portion having notches in the sides thereof, and longitudinal ribs in the sides of said mold receptacle forming trackways over which the notches in the lower portion of said end plate means slidably fit whereby said end plate means is held in an upright position within said mold receptacle.

4. An adjustable wall for a mold of the class described, embodying two lower plate members disposed face to face, the upper portion of one of said lower plate members being notched to afford a transverse recess between said two plate members and the faces of said plate members adjacent said recess having vertical arcuate grooves therein, a stop shoulder provided at the upper ends of the arcuate grooves in one of said lower plate members, an upper plate member slidably disposed within the recess in said lower plate members, cylindrical portions on said upper plate member disposed within said arcuate grooves in said lower plate members, the upper ends of said cylindrical portions forming shoulders for engagement with the shoulders at the upper portion of the lower plate member whereby relative movement of said two plate members is limited, means releasably securing said two lower plate members together, and compression springs interposed between the upper plate member and the lower plate members urging the same into extended position.

JOSEPH KIPPER.